(12) United States Patent
Ozimek et al.

(10) Patent No.: US 11,643,281 B2
(45) Date of Patent: *May 9, 2023

(54) METHOD AND APPARATUS FOR IDENTIFYING A MOVER ON A TRACK

(71) Applicant: Rockwell Automation Technologies, Inc., Mayfield Heights, OH (US)

(72) Inventors: Patrick E. Ozimek, Milwaukee, WI (US); Oliver C. Haya, Milwaukee, WI (US); Peter M. Smit, Mount Sinai, NY (US); Marc Koeppel, Union, KY (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 113 days.

This patent is subject to a terminal disclaimer.

(21) Appl. No.: 17/154,794

(22) Filed: Jan. 21, 2021

(65) Prior Publication Data
US 2021/0139251 A1    May 13, 2021

Related U.S. Application Data

(63) Continuation of application No. 15/672,788, filed on Aug. 9, 2017, now Pat. No. 10,906,748.

(51) Int. Cl.
*B65G 43/10*        (2006.01)
*H02K 1/14*         (2006.01)
(Continued)

(52) U.S. Cl.
CPC .............. *B65G 43/10* (2013.01); *B65G 54/02* (2013.01); *G01D 5/145* (2013.01); *G01D 5/2086* (2013.01);
(Continued)

(58) Field of Classification Search
CPC .. B65G 43/10; B65G 54/02; B65G 2203/042; G01D 5/145; G01D 5/2086; G01D 5/22; H02K 1/14; H02K 11/21; H02K 11/225; H02K 41/031; H02K 2201/15; G11B 20/1419; G11B 27/321
See application file for complete search history.

(56) References Cited

U.S. PATENT DOCUMENTS 6,781,524 B1    8/2004   Clark et al.
9,188,421 B2   11/2015   Prussmeier et al.
(Continued)

*Primary Examiner* — Muhammad S Islam
*Assistant Examiner* — Bradley R Brown
(74) *Attorney, Agent, or Firm* — Boyle Fredrickson, SC

(57) ABSTRACT

An improved system for determining the identification of movers in a motion control system is disclosed, where the motion control system includes multiple movers traveling on a track. The physical construction of at least one element of one of the movers is different on one mover than on each of the other movers. The control system for the movers detects the difference in construction and identifies the unique mover as a first mover. Each of the other movers along the track are assigned an identifier based on their relative position to the first mover. According to one embodiment, a position sensing system is utilized to identify the first mover. According to another embodiment, the drive system for the movers is utilized to identify the first mover. In still another embodiment, a combination of the position sensing system and the drive system is utilized to identify the first mover.

20 Claims, 11 Drawing Sheets

(51) Int. Cl.
　　　*H02K 41/03*　　　(2006.01)
　　　*G01D 5/20*　　　(2006.01)
　　　*G01D 5/22*　　　(2006.01)
　　　*H02K 11/225*　　(2016.01)
　　　*B65G 54/02*　　　(2006.01)
　　　*G01D 5/14*　　　(2006.01)
　　　*H02K 11/21*　　　(2016.01)
　　　*G11B 20/14*　　　(2006.01)
　　　*G11B 27/32*　　　(2006.01)

(52) U.S. Cl.
　　　CPC ............... *G01D 5/22* (2013.01); *H02K 1/14* (2013.01); *H02K 11/21* (2016.01); *H02K 11/225* (2016.01); *H02K 41/031* (2013.01); *B65G 2203/042* (2013.01); *G11B 20/1419* (2013.01); *G11B 27/321* (2013.01); *H02K 2201/15* (2013.01)

(56) References Cited

U.S. PATENT DOCUMENTS

| | | |
|---|---|---|
| 9,365,354 B2 | 6/2016 | Takagi |
| 9,511,681 B2 * | 12/2016 | Wernersbach ..... G05B 19/4189 |
| 2003/0230941 A1 | 12/2003 | Jacobs |
| 2013/0313072 A1 * | 11/2013 | van de Loecht ....... B65G 54/02 |
| | | 198/464.1 |
| 2014/0265645 A1 | 9/2014 | Jacobs et al. |
| 2014/0320058 A1 | 10/2014 | Takagi |
| 2015/0028098 A1 | 1/2015 | Kleinikkink et al. |
| 2015/0048817 A1 | 2/2015 | Prussmeier |

\* cited by examiner

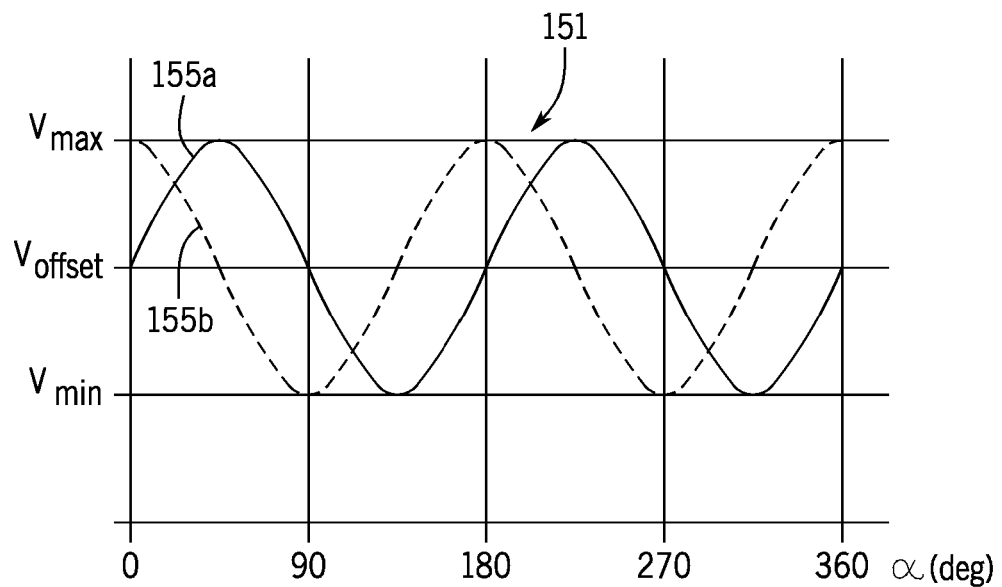
FIG. 13
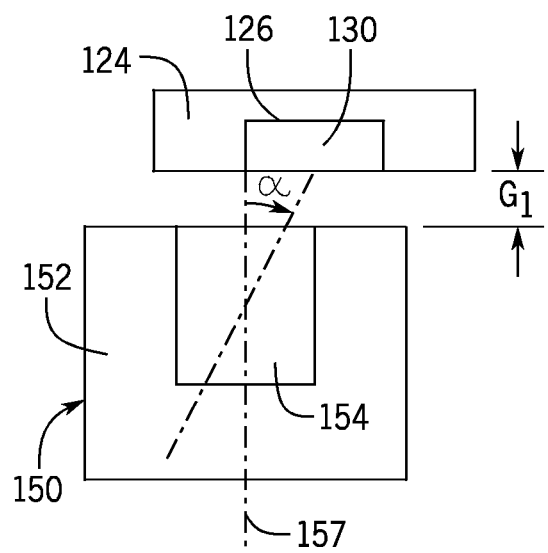 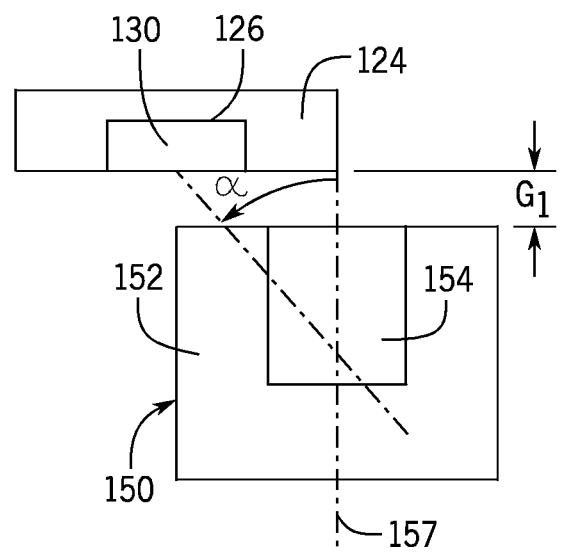
FIG. 14a  FIG. 14b

METHOD AND APPARATUS FOR IDENTIFYING A MOVER ON A TRACK

CROSS-REFERENCE TO RELATED APPLICATIONS

This application is a continuation of and claims priority to U.S. application Ser. No. 15/672,788, filed Aug. 9, 2017, the entire contents of which is incorporated herein by reference.

BACKGROUND INFORMATION

The present invention relates to motion control systems and, more specifically, to identification of a mover in a motion control system incorporating multiple movers propelled along a track using a linear drive system.

Motion control systems utilizing movers and linear motors can be used in a wide variety of processes (e.g. packaging, manufacturing, and machining) and can provide an advantage over conventional conveyor belt systems with enhanced flexibility, extremely high speed movement, and mechanical simplicity. The motion control system includes a set of independently controlled "movers" each supported on a track for motion along the track. The track is made up of a number of track segments that, in turn, hold individually controllable electric coils. Successive activation of the coils establishes a moving electromagnetic field that interacts with the movers and causes the mover to travel along the track. Sensors may be spaced at fixed positions along the track and/or on the movers to provide information about the position and speed of the movers.

Each of the movers may be independently moved and positioned along the track in response to the moving electromagnetic field generated by the coils. In a typical system, the track forms a closed path over which each mover repeatedly travels. At certain positions along the track other actuators may interact with each mover. For example, the mover may be stopped at a loading station at which a first actuator places a product on the mover. The mover may then be moved along a process segment of the track where various other actuators may fill, machine, position, or otherwise interact with the product on the mover. The mover may be programmed to stop at various locations or to move at a controlled speed past each of the other actuators. After the various processes are performed, the mover may pass or stop at an unloading station at which the product is removed from the mover. The mover then completes a cycle along the closed path by returning to the loading station to receive another unit of the product.

On some tracks, each of the movers are of identical construction. Although each mover is typically of "identical" construction, it is understood that there is some variation between movers due, for example, to manufacturing tolerances, wear, and the like. The variations between movers may result in variations, for example, in acceleration, deceleration, positioning, and the like as the mover is positioned along the track. In some applications, precise activation and positioning of the movers is required requiring, for example, sub-millimeter accuracy. As a result, each mover may be characterized, for example, during a commissioning process to detect any variations in individual movers from a design standard. A set of compensating variables may be stored in a controller corresponding to each mover to allow for the precise activation and positioning desired for each mover. However, in order to apply the correct compensation to each mover, it is necessary to know the identity of each mover.

On other tracks, movers of different construction may be utilized. Different movers may include, for example, different tooling to perform different operations. Optionally, movers may be of different size, for example, of alternating size to accommodate two different products on the same line. In still other systems, movers may operate independently or in combination with another mover. Adjacent movers may be configured to alternately operate with another mover but only in a specific direction from the mover. In order for the controller to properly control each mover, it must know the identity of each mover.

As is known to those skilled in the art, one mode of identifying movers is the use of radio frequency identification (RFID) in which RFID tags with unique identifiers are mounted on each mover. The unique identifier may be, for example, a multi-bit serial number associated with each mover. An RFID reader is positioned along the track which detects RFID tags on the movers and reads the unique identifier as the movers pass the RFID reader positioned. Upon power-up, an application program will typically execute a system start-up routine which drives the movers along the track so that each mover passes near the RFID reader. The RFID reader will obtain the unique identifier from each tag as it passes so that the identity of the mover can be determined. Use of RFID in product delivery systems is described in U.S. Pat. No. 7,931,197, entitled "RFID-based product manufacturing and lifecycle management," assigned to the present applicant, and hereby incorporated by reference.

The use of RFID tags and readers requires unique identifying information to be installed on each mover and a database of identifying information to be stored in a system database. Also, each mover must pass in close proximity to a RFID reader so that the RFID tags can be read. This process can be time consuming and intrusive, especially when resuming mover operations already in process.

Thus, it would be desirable to provide an improved system for determining the identification of movers in a motion control system.

BRIEF DESCRIPTION

The subject matter disclosed herein describes an improved system for determining the identification of movers in a motion control system. The motion control system includes multiple movers traveling on a track. The physical construction of at least one element of one of the movers is different on one mover than the physical construction of the corresponding element on each of the other movers. The control system for the movers is configured to detect the difference in construction and identify the unique mover as a first mover. Each of the other movers along the track are assigned an identifier based on their relative position to the first mover. According to one embodiment, a position sensing system is utilized to identify the first mover. The position sensing system is provided to determine a location of each mover on the track. The position sensing system includes an array of sensors positioned along the track and a position magnet located on each mover. The position magnet on the first mover has a different construction than the position magnet on the other movers, resulting in a different magnetic field being generated by the position magnet on the first mover than by the position magnets on the other movers. The array of sensors can detect the different magnetic field and identify the first mover. According to another embodiment, the drive system for the movers is utilized to identify the first mover. The drive system includes a plurality of drive magnets mounted on each mover. On the first mover, the polarity of the drive magnets is reversed from the polarity of the drive magnets on the other movers. As the coils along the track are energized, the response from each mover is detected and the first mover is identified. In still other embodiments, a combination of the position sensing system and the drive system is utilized to identify the first mover. In some instances when the position magnet on the first mover has a different construction than the position magnets on the other movers, some movement of the movers may be required to enable the sensors to detect the different construction. Optionally, a high frequency signal may be output by the coils to identify the location of the drive magnets and the location of the drive magnets may be compared to the location of the position magnets.

In one embodiment of the invention, a system for identifying a first mover is disclosed. The first mover is selected from multiple movers, and each of the movers travels along a track. The system includes multiple position magnets and multiple sensors. Each position magnet is mounted to one of the movers and generates a magnetic field. The sensors are spaced apart along the track, and each of the sensors generates a signal corresponding to the magnetic field generated by one of the position magnets. A first position magnet, selected from the multiple position magnets, is mounted to the first mover, and each of the plurality of sensors generates a first signal corresponding to the magnetic field generated by the first position magnet. Each of the sensors generates a second signal corresponding to the magnetic field generated by each of the other position magnets, and the first signal is different than the second signal.

According to another embodiment of the invention, a method for identifying a first mover is disclosed. The first mover is selected from multiple movers, and each of the movers travels along a track. Position signals are received at a controller, where each position signal is generated by one of multiple sensors spaced apart along the track. Each position signal corresponds to at least one position magnet mounted to one mover, and the controller is configured to determine a relative location of each mover along the track as a function of each position signal and of an identity of the sensor which detected the corresponding position signal. Each of the plurality of position signals is compared to each other in the controller and a magnetic field generated by the position magnets on one mover that is different than a magnetic field generated by the position magnets mounted on each of the other movers is identified in the controller. The first mover is identified with the controller as the one mover with the magnetic field different than the other magnetic fields.

According to still another embodiment of the invention, a system for identifying a first mover is disclosed. The first mover is selected from multiple movers, where each of the movers travels along a track. The system includes a position sensing system and a drive system. The position sensing system includes multiple position magnets and multiple sensors. Each position magnet is mounted to one of the movers and generates a magnetic field. Each sensor is spaced apart along the track and generates a signal corresponding to the magnetic field generated by one of the plurality of position magnets. The drive system includes multiple coils and multiple drive magnets. The coils are mounted along the track, and the drive magnets are mounted to each mover. A controlled current supplied to the plurality of coils generates an electromagnetic field that interacts with the plurality of drive magnets to control motion of each of the plurality of movers. The first mover includes a first position magnet and a first set of drive magnets, and each of the other movers includes a second position magnet and a second set of drive magnets. At least one of the first position magnet or the first set of drive magnets is mounted differently or of a different construction than the second position magnet and the second set of drive magnets, respectively, and the first mover is identified as a function of the different mounting or of the different construction between the first and second position or drive magnets.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Various exemplary embodiments of the subject matter disclosed herein are illustrated in the accompanying drawings in which like reference numerals represent like parts throughout, and in which:

FIG. 13 is a graphical representation of a signal generated by a magnetic sensor incorporated into one embodiment of the position sensing system to identify movers along the track;

FIG. 14a is a partial top sectional view illustrating a mover at a first orientation with respect to the magnetic sensor of FIG. 3; and FIG. 14b is a partial top sectional view illustrating a mover at a second orientation with respect to the magnetic sensor of FIG. 3.

Figure 1:
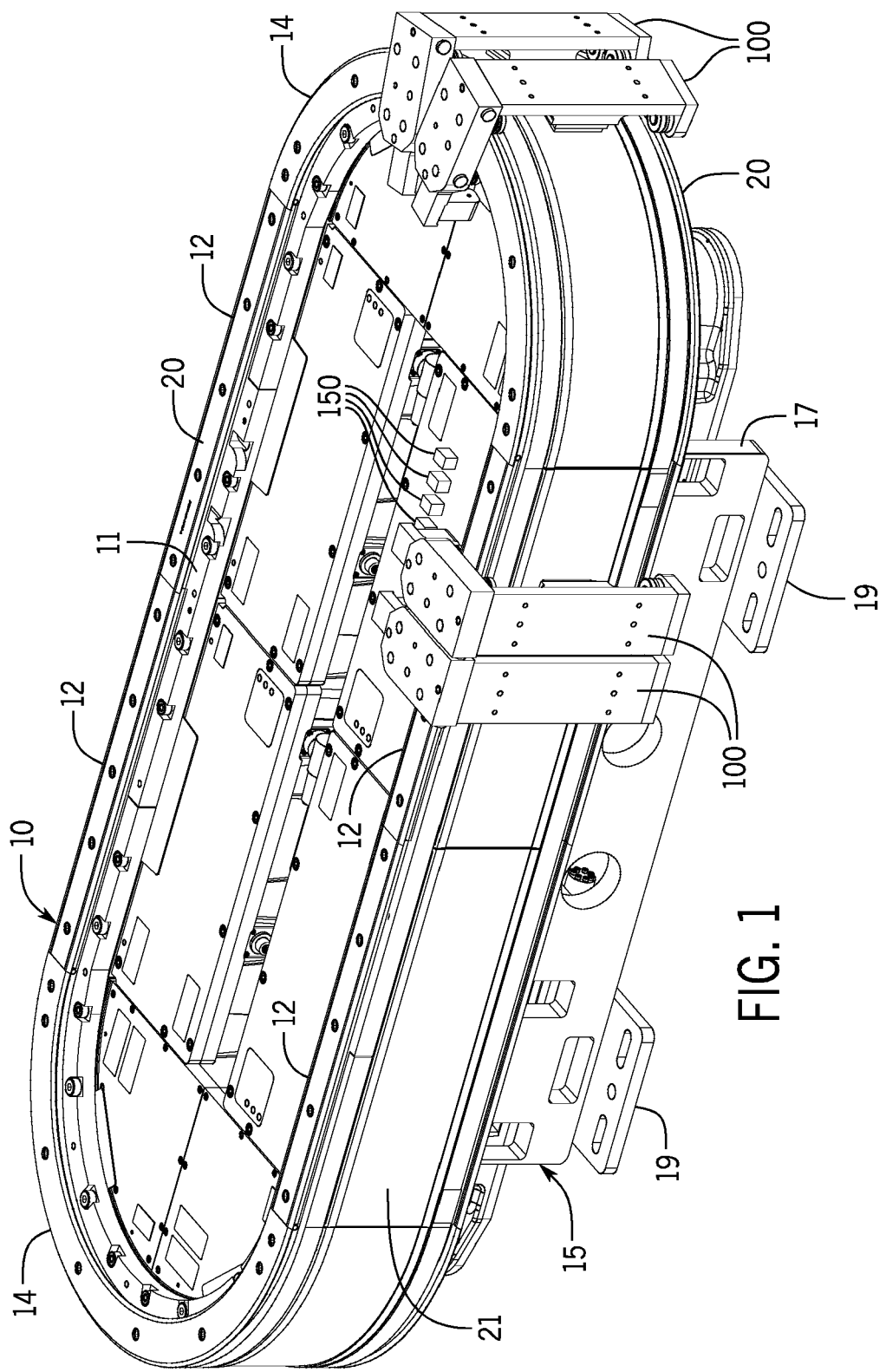
FIG. 1 is an isometric view of an exemplary transport system incorporating multiple movers travelling along a closed curvilinear track according to one embodiment of the present invention.

In describing the various embodiments of the invention which are illustrated in the drawings, specific terminology will be resorted to for the sake of clarity. However, it is not intended that the invention be limited to the specific terms so selected and it is understood that each specific term includes all technical equivalents which operate in a similar manner to accomplish a similar purpose. For example, the word "connected," "attached," or terms similar thereto are often used. They are not limited to direct connection but include connection through other elements where such connection is recognized as being equivalent by those skilled in the art.

DETAILED DESCRIPTION

The various features and advantageous details of the subject matter disclosed herein are explained more fully with reference to the non-limiting embodiments described in detail in the following description.

Turning initially to FIG. 1, an exemplary transport system for moving articles or products includes a track 10 made up of multiple segments 12, 14. According to the illustrated embodiment, the segments define a generally closed loop supporting a set of movers 100 movable along the track 10. The track 10 is oriented in a horizontal plane and supported above the ground by a base 15 extending vertically downward from the track 10. According to the illustrated embodiment, the base 15 includes a pair of generally planar support plates 17, located on opposite sides of the track 10, with mounting feet 19 on each support plate 17 to secure the track 10 to a surface. The illustrated track 10 includes four straight segments 12, with two straight segments 12 located along each side of the track and spaced apart from the other pair. The track 10 also includes four curved segments 14 where a pair of curved segments 14 is located at each end of the track 10 to connect the pairs of straight segments 12. The four straight segments 12 and the four curved segments 14 form a generally oval track and define a closed surface over which each of the movers 100 may travel. It is understood that track segments of various sizes, lengths, and shapes may be connected together to form a track 10 without deviating from the scope of the invention.

For convenience, the horizontal orientation of the track 10 shown in FIG. 1 will be discussed herein. Terms such as upper, lower, inner, and outer will be used with respect to the illustrated track orientation. These terms are relational with respect to the illustrated track and are not intended to be limiting. It is understood that the track may be installed in different orientations, such as sloped or vertical, and include different shaped segments including, but not limited to, straight segments, inward bends, outward bends, up slopes, down slopes and various combinations thereof. Further, each track segment 12, 14 is shown in a generally horizontal orientation. The track segments 12, 14 may also be oriented in a generally vertical orientation and the width of the track 10 may be greater in either the horizontal or vertical direction according to application requirements. The movers 100 will travel along the track and take various orientations according to the configuration of the track 10 and the relationships discussed herein may vary accordingly.

Figure 3:
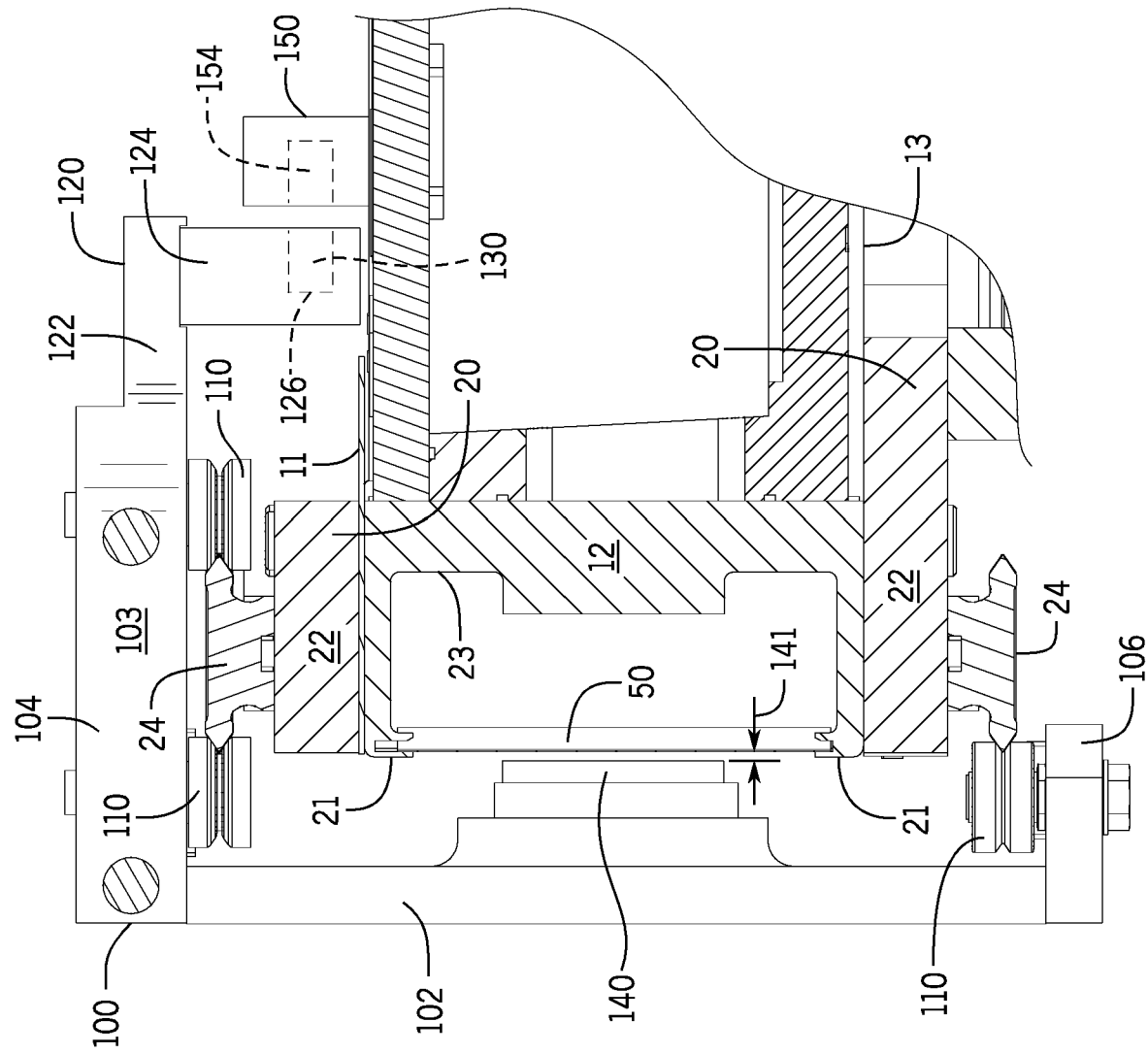
FIG. 3 is a partial sectional view of the transport system of FIG. 1.

Each track segment 12, 14 includes a number of independently attached rails 20 on which each mover 100 runs. According to the illustrated embodiment, rails 20 extend generally along the outer periphery of the track 10. A first rail 20 extends along an upper surface 11 of each segment and a second rail 20 extends along a lower surface 13 of each segment. With reference also to FIG. 3, the illustrated embodiment of each rail 20 includes a base 22 and a track portion 24. The base 22 is secured to the upper surface 11 or lower surface 13 of each segment 12, 14 and the track portion 24 is mounted to the base 22. It is contemplated that each rail 20 may be a singular, molded or extruded member or formed from multiple members. It is also contemplated that the cross section of the rails 20 may be circular, square, rectangular, or any other desired cross-sectional shape without deviating from the scope of the invention. The rails 20 generally conform to the curvature of the track 10 thus extending in a straight path along the straight track segments 12 and in a curved path along the curved track segments 14. The rails 20 may be thin with respect to the width of the track 10 and span only a partial width of the surface of the track 10 on which it is attached. Each mover 100 includes complementary rollers 110 to engage the track portion 24 of the rail 20 for movement along the track 10.

Figure 4:
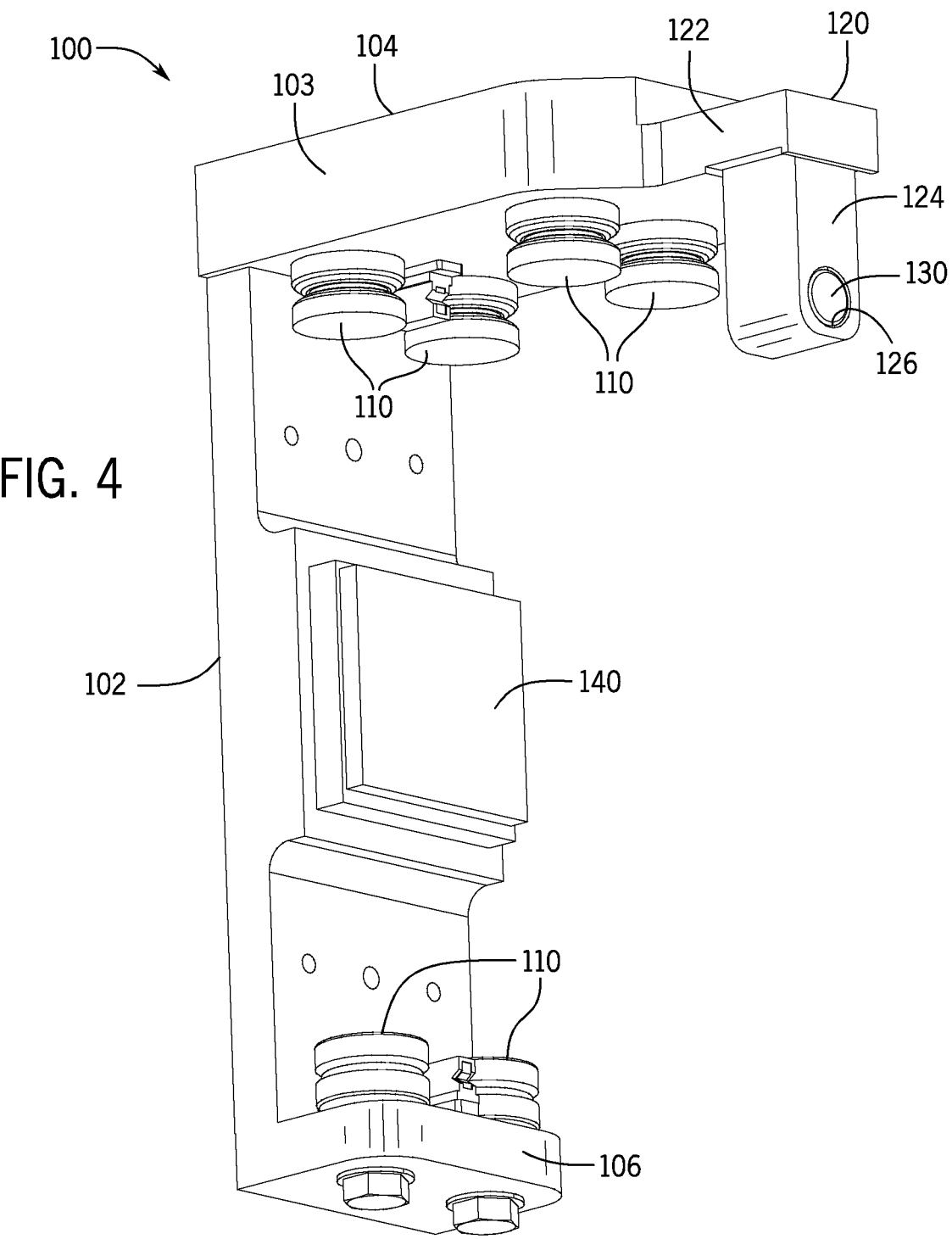
FIG. 4 is an isometric view of a mover from the transport system of FIG. 1.
Figure 5:
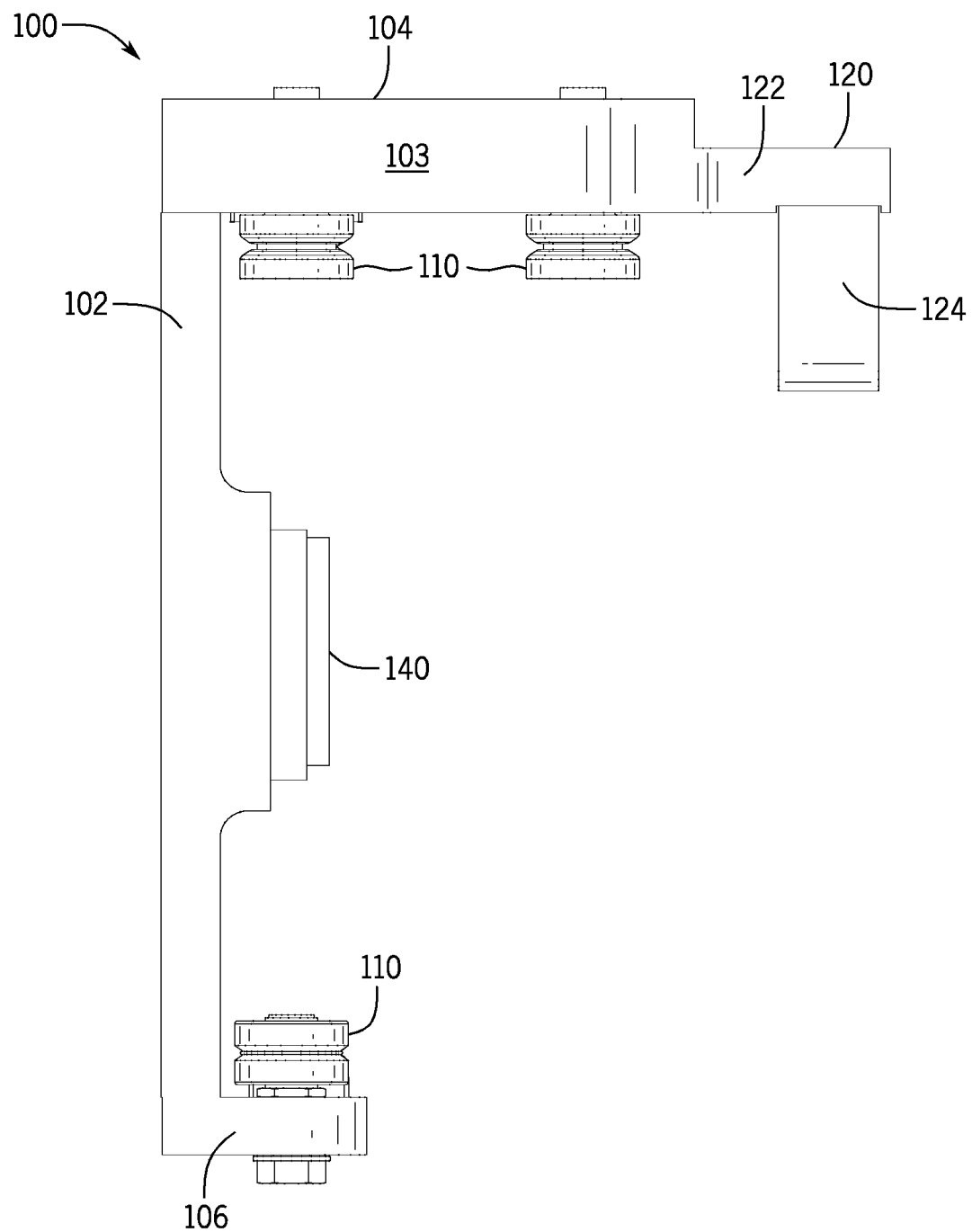
FIG. 5 is a side elevation view of the mover of FIG. 4.
Figure 6:
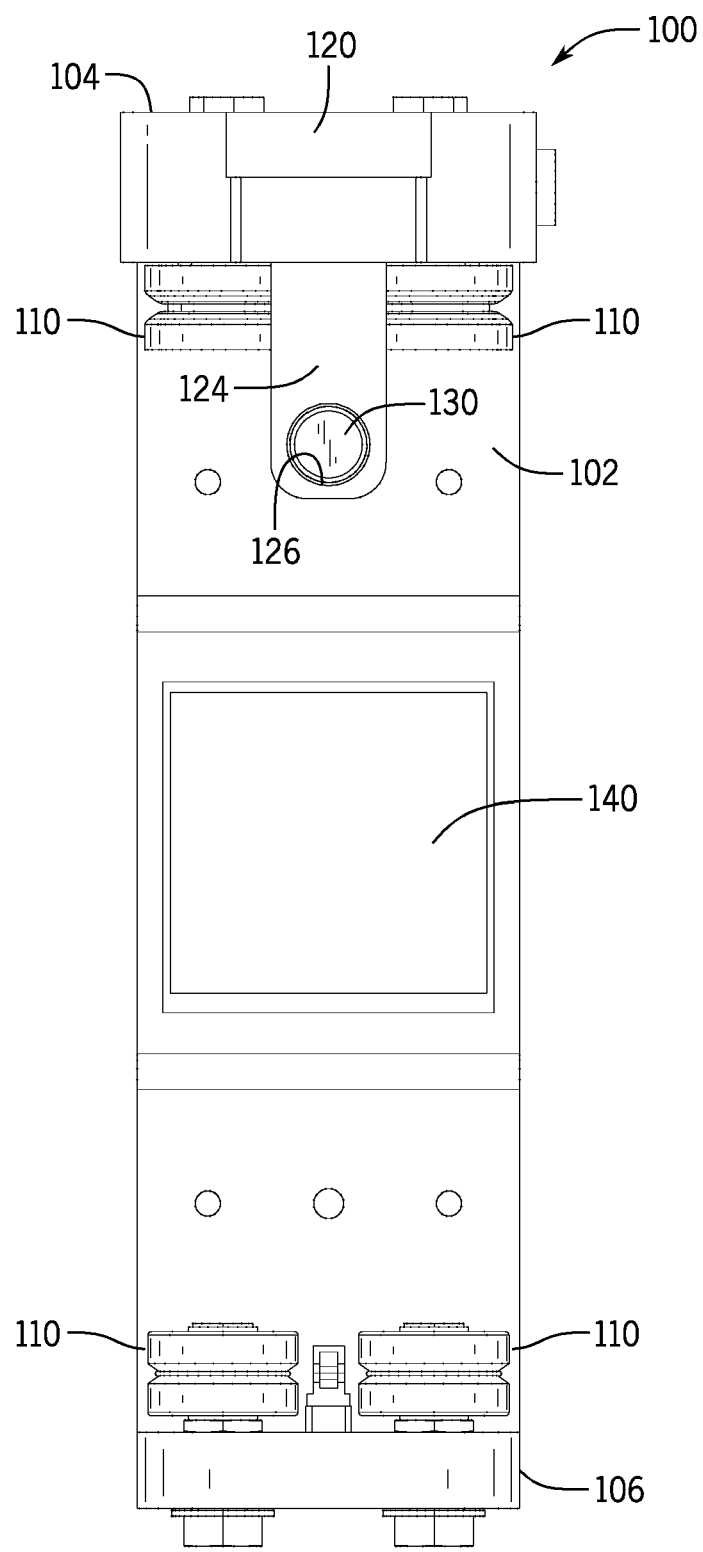
FIG. 6 is a front elevation view of the mover of FIG. 4.

One or more movers 100 are mounted to and movable along the rails 20 on the track 10. With reference next to FIGS. 4-6, an exemplary mover 100 is illustrated. Each mover 100 includes a side member 102, a top member 104, and a bottom member 106. The side member 102 extends for a height at least spanning a distance between the rail 20 on the top surface 11 of the track 10 and the rail 20 on the bottom surface 13 of the track 10 and is oriented generally parallel to a side surface 21 when mounted to the track 10. The top member 104 extends generally orthogonal to the side member 102 at a top end of the side member 102 and extends across the rail 20 on the top surface 11 of the track 10. The top member 104 includes a first segment 103, extending orthogonally from the side member 102 for the width of the rail 20, which is generally the same width as the side member 102. A set of rollers 110 are mounted on the lower side of the first segment 103 and are configured to engage the track portion 24 of the rail 20 mounted to the upper surface 11 of the track segment. According to the illustrated embodiment two pairs of rollers 110 are mounted to the lower side of the first segment 103 with a first pair located along a first edge of the track portion 24 of the rail and a second pair located along a second edge of the track portion 24 of the rail 20. The first and second edges and, therefore, the first and second pairs of rollers 110 are on opposite sides of the rail 20 and positively retain the mover 100 to the rail 20. The bottom member 106 extends generally orthogonal to the side member 102 at a bottom end of the side member 102 and extends for a distance sufficient to receive a third pair of rollers 110 along the bottom of the mover 100. The third pair of rollers 110 engage an outer edge of the track portion 24 of the rail 20 mounted to the lower surface 13 of the track segment. Thus, the mover 100 rides along the rails 20 on the rollers 110 mounted to both the top member 104 and the bottom member 106 of each mover 100. The top member 104 also includes a second segment 120 which protrudes from the first segment 103 an additional distance beyond the rail 20 and is configured to hold a position magnet 130. According to the illustrated embodiment, the second segment 120 of the top member 104 includes a first portion 122 extending generally parallel to the rail 20 and tapering to a smaller width than the first segment 103 of the top member 104. The second segment 120 also includes a second portion 124 extending downward from and generally orthogonal to the first portion 122. The second portion 124 extends downward a distance less than the distance to the upper surface 11 of the track segment but of sufficient distance to have the position magnet 130 mounted thereto. According to the illustrated embodiment, a position magnet 130 is mounted within a recess 126 on the second portion 124 and is configured to align with a sensor 150 mounted to the top surface 11 of the track segment.

Figure 2:
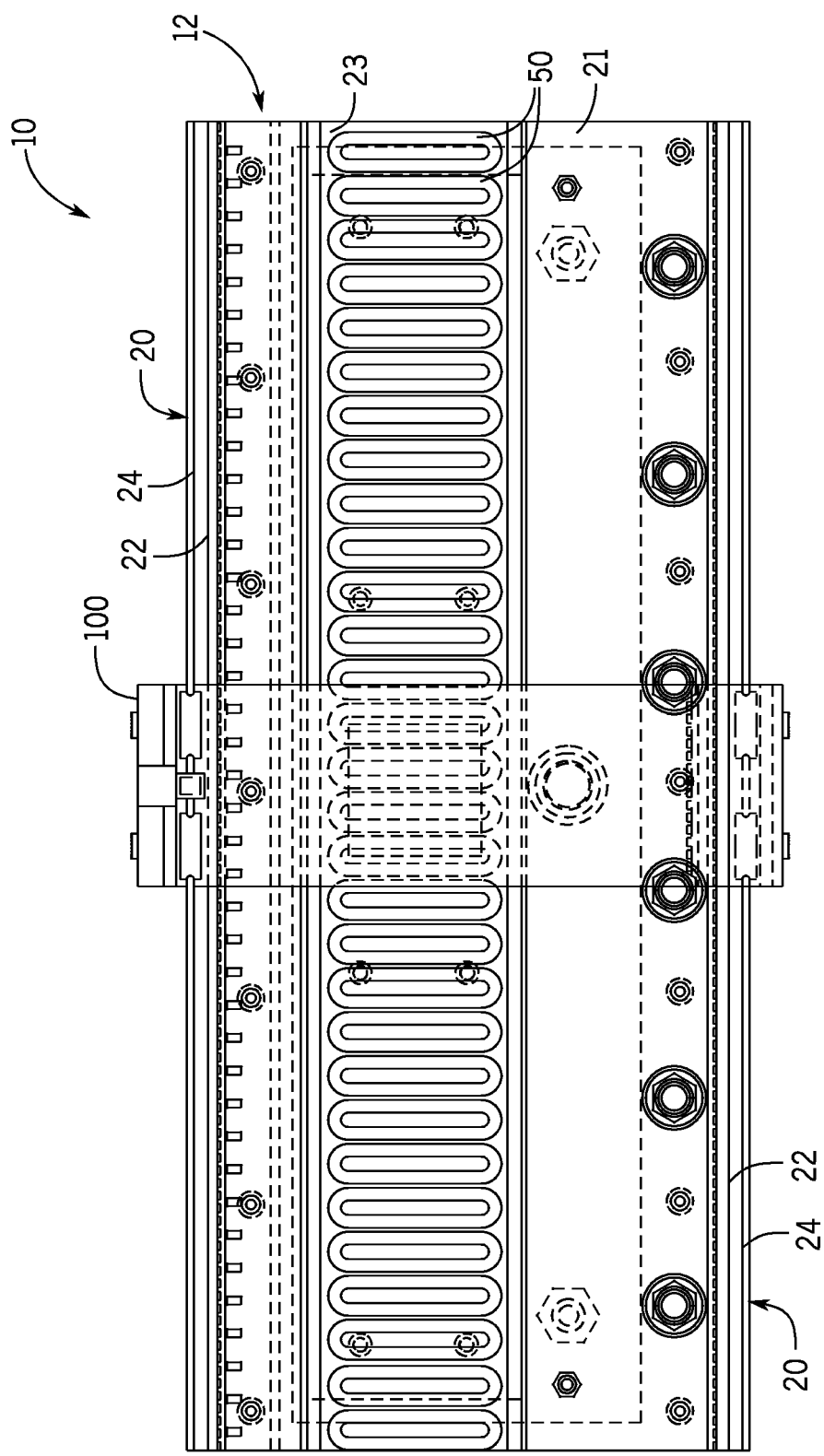
FIG. 2 is a partial side elevation view of one segment of the transport system of FIG. 1 illustrating activation coils distributed along one surface of the track segment.

A linear drive system is incorporated in part on each mover 100 and in part within each track segment 12, 14 to control motion of each mover 100 along the segment. On each mover 100, the linear drive system includes multiple drive magnets mounted to the side member 102. According to the illustrated embodiment, the drive magnets 140 are arranged in a block along an inner surface of the side member 102 with separate magnet segments 142, 144 alternately having a north pole 142, N, and south pole 144, S, pole facing the track segment 12 (see also FIG. 10a, 10b). The drive magnets 140 are typically permanent magnets, and two adjacent magnet segments including a north pole 142 and a south pole 144 may be considered a pole-pair. The drive magnets 140 are mounted on the inner surface of the side member 102 and when mounted to the track 10 are spaced apart from a series of coils 50 extending along the track 10. As shown in FIG. 3, an air gap 141 is provided between each set of drive magnets 140 and the coils 50 along the track 10. On the track 10, the linear drive system includes a series of parallel coils 50 spaced along each track segment 12 as shown in FIG. 2. According to the illustrated embodiment, each coil 50 is placed in a channel 23 extending longitudinally along one surface of the track segment 12. The electromagnetic field generated by each coil 50 spans the air gap and interacts with the drive magnets 140 mounted to the mover 100 to control operation of the mover 100.

Figure 7:
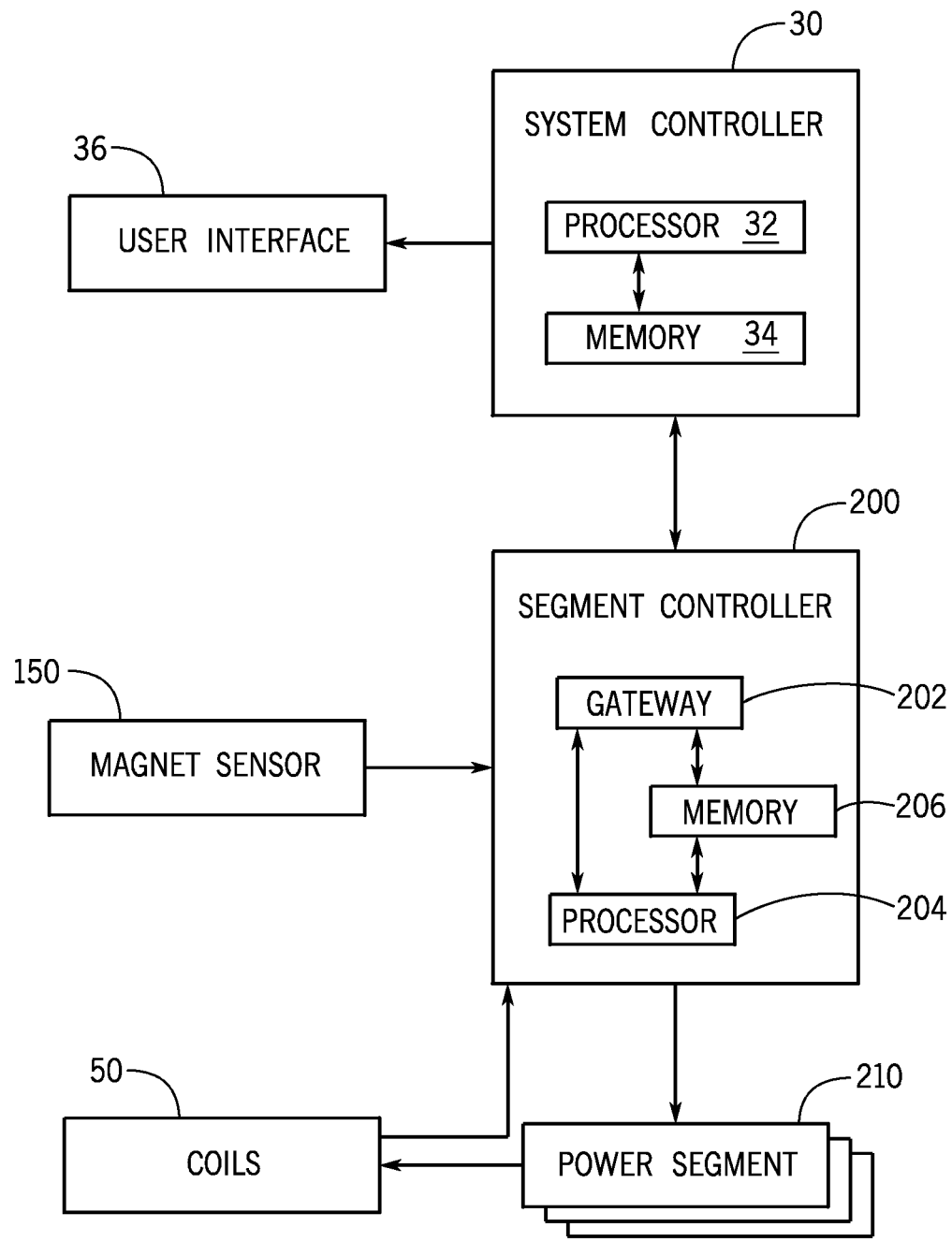
FIG. 7 is a block diagram representation of a motion control system incorporating an embodiment of the mover identification system disclosed herein as applied to the transport system of FIG. 1.

Turning next to FIG. 7, an exemplary control system for the track 10 and linear drive system is illustrated. A segment controller 200 is mounted within each track segment 12, 14. The segment controller 200 receives command signals from a system controller 30 and generates switching signals for power segments 210 which, in turn, control activation of each coil 50. Activation of the coils 50 are controlled to drive and position each of the movers 100 along the track segment 12 according to the command signals received from the system controller 30.

The illustrated motion control system includes a system controller 30 having a processor 32 and a memory device 34. It is contemplated that the processor 32 and memory device 34 may each be a single electronic device or formed from multiple devices. The processor may be 32 a microprocessor. Optionally, the processor 32 and/or the memory device 34 may be integrated on a field programmable array (FPGA) or an application specific integrated circuit (ASIC). The memory device 34 may include volatile memory, non-volatile memory, or a combination thereof. A user interface 36 is provided for an operator to configure the system controller 30 and to load or configure desired motion profiles for the movers 100 on the system controller 30. It is contemplated that the system controller 30 and user interface 36 may be a single device, such as a laptop, notebook, tablet or other mobile computing device. Optionally, the user interface 36 may include one or more separate devices such as a keyboard, mouse, display, touchscreen, interface port, removable storage medium or medium reader and the like for receiving information from and displaying information to a user. Optionally, the system controller 30 and user interface 36 may be integrated into an industrial computer mounted within a control cabinet and configured to withstand harsh operating environments. It is contemplated that still other combinations of computing devices and peripherals as would be understood in the art may be utilized or incorporated into the system controller 30 and user interface 36 without deviating from the scope of the invention.

One or more programs may be stored in the memory device 34 for execution by the processor 32. The system controller 30 receives one or more motion profiles for the movers 100 to follow along the track 10. A program executing on the processor 32 is in communication with a segment controller 200 on each track segment 12, 14. The system controller 30 may transfer a desired motion profile to each segment controller 200 or, optionally, the system controller 30 may perform some initial processing based on the motion profile to transmit a segment of the motion profile to each segment controller 200 according to the portion of the motion profile to be executed along that segment. Optionally, the system controller 30 may perform still further processing on the motion profile and generate a desired switching sequence for each segment 12, 14 that may be transmitted to the segment controller 200.

A gateway 202 in each segment controller 200 receives the communications from the system controller 30 and passes the communication to a processor 204 executing in the segment controller 200. The processor may be a microprocessor. Optionally, the processor 204 and/or a memory device 206 within the segment controller 200 may be integrated on a field programmable array (FPGA) or an application specific integrated circuit (ASIC). It is contemplated that the processor 204 and memory device 206 may each be a single electronic device or formed from multiple devices. The memory device 206 may include volatile memory, non-volatile memory, or a combination thereof. The segment controller 200 receives the motion profile, or portion thereof, or the switching sequence transmitted from the system controller 30 and utilizes the motion profile or switching sequence to control movers 100 present along the track segment 12, 14 controlled by that system controller 30.

Each segment controller 200 generates switching signals to control operation of switching devices within one or more power segments 210 mounted within the track segment 12, 14. The processor 204 receives feedback signals from sensors providing an indication of the current operating conditions within the power segment 210 or the current operating conditions of a coil 50 connected to the power segment 210. The switching devices within each power segment 210 are connected between a power source and the coils 50. The switching signals are generated to sequentially energize coils 50 along a track segment, where the energized coils 50 create an electromagnetic field that interacts with the drive magnets 140 on each mover 100 to control motion of the movers 100 along the corresponding track segment 12, 14.

In operation, the system controller 30 executes to control each of the movers 100 on the track 10. As previously discussed, each mover 100 may have some variation in construction and, therefore, the controller 30 may compensate control of the coils 50 in the drive system according to the mover 100 to be controlled to accurately position each mover. In order to provide the varying compensation to each mover 100, the system controller 30 must know the identification of each mover 100 along the track 10.

When power is cycled, the potential exists that movers 100 are manually repositioned, added, or removed for maintenance. As a result, the system controller 30 determines the identification of each mover along the track 10 during each power up cycle. According to the illustrated embodiment, the track 10 is a closed track. In other words, after power-up and during normal operation, movers 100 repeatedly travel over the same segments 12, 14 and no movers 100 are introduced to or removed from the track 10. Rather than providing unique identifiers for every mover 100, the present inventors have determined a method of identifying a single mover 100 along the track. The identified mover 100 is referred to herein as the first mover. After identifying the first mover, the system controller 30 may then incrementally assign numbers to each subsequent mover 100 in either a positive or a negative direction along the track 10 to identify each of the movers 100 along the track. It is understood that various other numbering methods, such as decrementing, incrementing by intervals greater than one, and the like may be utilized without deviating from the scope of the invention.

A position sensor system is provided to detect the location of each mover 100 along the track. The position sensor system may be as described in U.S. Pat. No. 9,511,681, entitled "Controlled motion system having an improved track configuration," and US Patent Publication No. 2014/0265645, entitled "Controlled motion system having a magnetic flux bridge joining linear motor sections," both assigned to the present applicant, and both of which are hereby incorporated by reference. The position sensor system includes a first member and a second member where the first member is mounted to each mover 100 and the second member is mounted to the track 10. One member is to be sensed while the other member senses. As a mover 100 travels along the track 10, the first and second members interact to detect the position of each mover 100.

Referring again to FIGS. 1 and 3, an array of sensors 150 is provided along the top surface 11 of the track 10. A position magnet 130 is mounted in the top member 104 of each mover at a location that is proximate to each sensor 150 as the mover 100 passes the sensor 150. The sensors 150 are a suitable magnetic field detector including, for example, a Hall Effect sensor, a magneto-diode, an anisotropic magnetoresistive (AMR) device, a giant magnetoresistive (GMR) device, a tunnel magnetoresistance (TMR) device, fluxgate sensor, or other microelectromechanical (MEMS) device configured to generate an electrical signal corresponding to the presence of a magnetic field. The magnetic field sensor 150 outputs a feedback signal 151 to the segment controller 200 for the corresponding track segment 12, 14 on which it is mounted. The feedback signal 151 may be an analog signal 155 of a type illustrated, for example, in FIG. 13. The sensor 150 includes a support member 152 and a transducer 154, where the support member 152 is affixed to the top surface 11 of the track and positions the transducer 154 at a desired location. The transducer 154 includes a central axis 157 extending horizontally, as illustrated, across the gap, $G_1$, (see FIG. 14a, 14b) between the sensor and position magnet 130 in a mover 100 passing by the transducer 154. As the center of the position magnet 130 approaches the central axis 157, the angle, $\alpha$, changes and the magnitude of the signal generated by the transducer 154 similarly changes as a function of the angle $\alpha$.

With reference again to FIG. 7, each magnetic field sensor 150 transmits the feedback signal 151 to the segment controller 200. An array of sensors 150 are spaced along the segment, such that the mover generates a signal on at least one sensor 150 at all times as it travels along the track segment. According to an exemplary embodiment, the sensors 150 are positioned at 20 mm intervals. The segment controller 200 identifies which sensor 150 is generating a signal. The segment controller 200 may convert the feedback signal 151 to a digital signal corresponding to the analog feedback signal 151 and transmit the signal to the system controller 30. Optionally, the segment controller 200 may transmit the feedback signal 151 directly or perform further processing on the feedback signal 151 prior to transmitting the signal to the system controller 30. For example, each segment controller 200 may have knowledge of the location of each sensor 150 along its segment and generate a value corresponding to a position along the length of the segment at which each mover 100 is located. According to still another option, the segment controller 200 may transmit the identity of the sensor 150 along with the corresponding feedback signal 151 to the system controller 30 which, in turn, determines the position of each mover 100 along the track 10.

In order to identify the first mover, the position magnet 130 for one of the movers 100 has a different construction than the position magnet 130 for each of the other movers 100. The feedback signal 151 generated by the sensor varies, for example, as a function of the location of the position magnet 130 with respect to the sensor 150 and as a function of the strength of the magnetic field generated by the position magnet 130. Therefore, a first position magnet is mounted to the first mover and each of the remaining movers receive a second position magnet, where the first position magnet is different than second position magnet. As a result, the sensor 150 generates a first feedback signal corresponding to the first position magnet and a second feedback signal corresponding to the second position magnet, where the first feedback signal is different than the second feedback signal. The inventors have identified a number of embodiments of the invention by which the first and second position magnets may vary resulting in a different feedback signal being generated by the sensor 150 to identify the first mover 100.

Figure 8A:
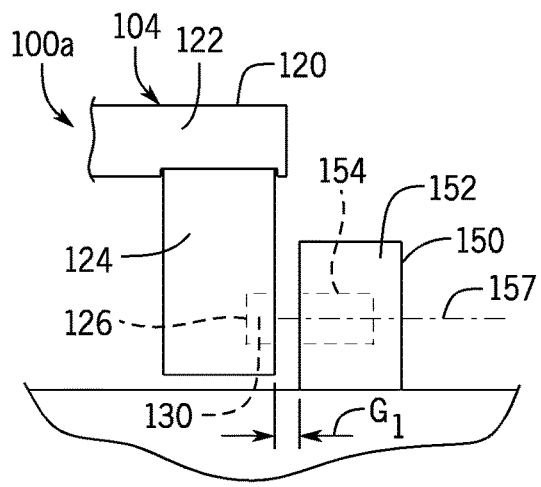
FIG. 8a is a partial side elevation view of the mover of FIG. 1 and a sensor for detecting a position magnet mounted on the mover with a first air gap defined between the position magnet and the sensor.
Figure 8B:
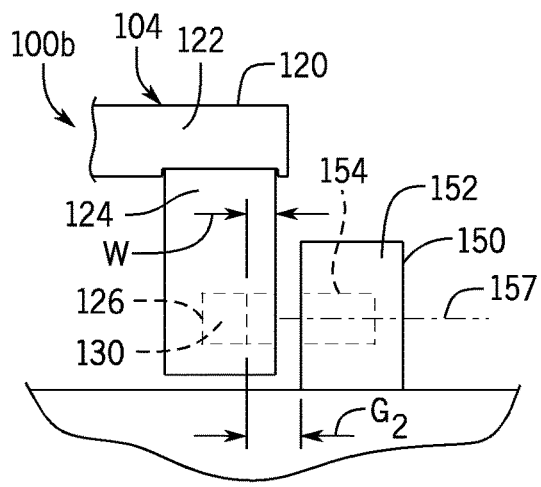
FIG. 8b is a partial side elevation view of the mover of FIG. 1 and the sensor for detecting the position magnet mounted on the mover with a second air gap defined between the position magnet and the sensor.

According to a first embodiment of the invention, the gap between the position magnet 130 and the sensor 150 is set differently for the first mover than for each of the other movers. Referring next to FIGS. 8a and 8b, a first air gap, $G_1$, and a second air gap, $G_2$, are illustrated. In FIG. 8a, it is contemplated that the position magnet 130 will typically be mounted flush with the surface of the second portion 124 of the second segment 120 of the top member 104 of the mover 100. A first air gap, $G_1$, is defined between the surface of the position magnet 130 and the transducer 154 in the magnetic field sensor 150. As each mover 100a passes a sensor 150, the feedback signal 151 will have a first peak voltage (i.e., $V_{min}$ and $V_{max}$ in FIG. 13). In FIG. 8b, the recess 126 has a greater depth such that the surface of the position magnet 130 is recessed by a width, W, from the surface of the second portion 124 of the second segment 120 of the top member 104 of the mover 100. As a result, a second air gap, $G_2$, is defined between the surface of the position magnet 130 and the transducer 154 in the magnetic field sensor 150. As the second mover 100b passes each sensor 150 the feedback signal 151 will have a second peak voltage, where the second peak voltage is different than the first peak voltage. It is contemplated that the first mover could be constructed with either the first air gap, $G_1$, or second air gap, $G_2$, and the remaining movers would then be constructed with the second air gap or the first air gap, respectively.

It is further contemplated that the sensor 150 may be configured to generate both a sine waveform 155a and a cosine waveform 155b corresponding to the magnetic field of each position magnet 130 passing in front of the sensor 150, and both signals may be provided as feedback signals 151 to the segment controller 200. Either the segment controller 200 or the system controller 30 may determine a sum of the squared values of both the sine and the cosine feedback signals. The resulting sum allows the controller to determine the width of the air gap. The system controller 30 may receive or may determine the width of the air gap for each mover 100 and identify the first mover according to the position magnet 130 that has an air gap that differs from the air gap of the other position magnets 130. Optionally, a preset value of the width of the air gap for the first mover or of the width for each of the other movers may be stored in the memory 34 or 206 for either the segment controller 200 or the system controller 30, and the controller may compare the widths measured from the feedback signals 151 to the stored preset values and identify which of the movers 100 is the first mover. In this manner, the first mover may be identified quickly upon power up without requiring motion of any of the movers 100.

According to another aspect of the invention, the position sensors 150 may be spaced along the track at a distance that permits multiple sensors 150 to detect the magnetic field generated by one position magnet 130. Thus, the strength of the magnetic field detected at two or more sensors and, therefore, at two or more locations along the track may be compared to determine the location of each position magnet 130 with respect to the locations of each sensor 150 sensing the magnetic field generated by the magnet 130. If the width of the air gap varies, the strength of the magnetic field detected by the position sensor 150 will vary for two movers at the same location. Similarly, if a mover 100 is at a first location and a second location with respect to a position sensor 150, the strength of the magnetic field detected by the sensor 150 will vary as a function of the distance along the rail 20 that each position magnet 130 is displaced from the sensor 150. In order to distinguish between a different width of the air gap or displacement along the rails 20, the controller uses the signals from multiple sensors 150 and the relative strength of the signal present at each of the multiple sensors to determine the location of each position magnet 130. The memory 34, 306 in the system controller 30 or the segment controller 200, respectively, may include a look-up table which includes the relationship between the strength of the magnetic field detected at each sensor 150 and the correspondence to the width of the air gap between the position magnet 130 and the sensor 150. The controller may utilize the look-up table to identify the width of the air gap on each mover and, thereby identify on which mover the air gap is different than the air gap on the other movers.

Figure 9A:
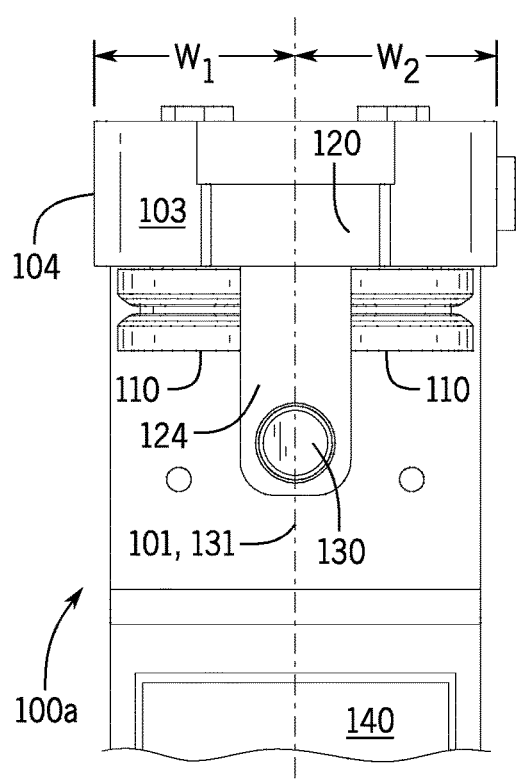
FIG. 9a is a partial front elevation view of the mover of FIG. 1 with a position magnet mounted on the mover in a first position with respect to a central axis of the mover.
Figure 9B:
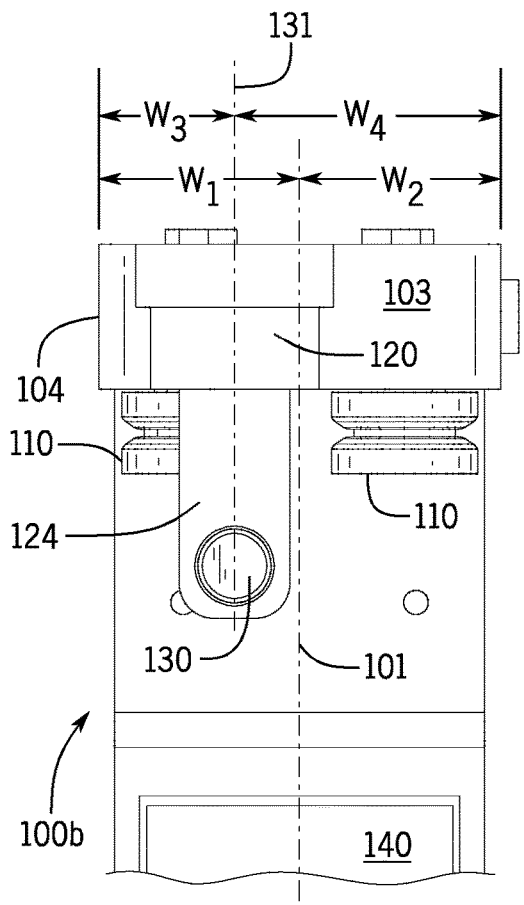
FIG. 9b is a partial front elevation view of the mover of FIG. 1 with a position magnet mounted on the mover in a second position with respect to a central axis of the mover.

According to another embodiment of the invention, the location of the position magnet 130 on the mover 100 is set differently for the first mover than for each of the other movers. Referring next to FIGS. 9a and 9b, each mover 100a, 100b includes a central axis 101 extending generally orthogonal to the direction of travel along the track. According to the illustrated embodiment, each mover 100 has a greater height than width and the central axis 101 extends longitudinally from the bottom to the top of the mover 100. The position magnet 130 also includes a central axis 131 for the magnet, extending generally parallel to the central axis 101 of the mover 100. In a first construction, shown in FIG. 9a, the position magnet 130 is mounted on the mover 100 such that the central axis 101 of the mover 100 and the central axis 131 of the position magnet 130 are aligned with each other when viewed from the front of the mover 100 and both central axes are generally orthogonal to the direction of travel of the mover 100. As illustrated, both axis 101, 131 are located a first width, $W_1$, from one side of the mover 100 and a second width, $W_2$, from the other side of the mover 100, where the first width, $W_1$, and the second width, $W_2$, are identical. In a second construction, shown in FIG. 9b, the position magnet 130 is mounted on the mover 100 such that the central axis 131 of the position magnet 130 is offset in a lateral direction, or along the direction of travel, from the central axis 101 of the mover 100. As illustrated, the central axis 101 of the mover 100 is still located a first width, $W_1$, from a first side of the mover 100 and a second width, $W_2$, from a second side of the mover 100, where the first width, $W_1$, and the second width, $W_2$, are identical. However, the central axis 131 of the position magnet 130 is located a third width, $W_3$, from the first side of the mover 100 and a fourth width, $W_4$, from the second side of the mover 100, where the third width, $W_3$, and the fourth width, $W_4$, are different. It is contemplated that the first mover could be constructed either with the central axes 101, 131 having the same width from each side or with the central axes 101, 131 having different widths from each side and the remaining movers would then have the opposite construction.

When the location of the position magnet 130 is offset from the sides of the mover 100 differently for the first mover than for each of the other movers, the controller utilizes both the position sensing system and the drive system to detect the first mover. The segment controller 200 generates switching signals to control operation of the switching devices in each power segment 210 at a high frequency, where the high frequency may be, for example, an order of magnitude or more greater than a rated excitation frequency used to drive each mover 100. The power segments 210 are further controlled, such that an amplitude of voltage and/or current output to the coils 50, in combination with the higher frequency of the output current, generates little or no movement of the movers 100 along the track. When generating the high frequency output voltage to each coil, the voltage and/or current in each coil is sensed. The presence of a mover 100 adjacent to a coil will generate a saliency in the feedback signal. The saliency is a ripple, spike, or other disturbance in the feedback signal that is repeatable and detectable and is function of the location of the drive magnets 140 on the mover with respect to the coil. The controller uses the detected saliencies to determine the location of the drive magnets 140 on the mover along the track. Based on the location of the drive magnets 140 for each mover, the controller, in turn, determines the location of the central axis 101 for each mover 100. The position sensing system detects the location of the central axis 131 for each position magnet 130 along the length of the track. Each segment controller 200 may then compare the locations of the central axes 101 for each mover 100 with the locations of the central axes 131 for each position magnet 130 along its respective section of track 10 to identify whether each mover has aligned or offset central axes. Optionally, the system controller 30 may determine whether each mover 100 has aligned or offset central axes for each of the movers 100 along the entire track 10. The first mover is identified as the mover 100 that has central axes 101, 131 aligned differently than the central axes of each of the other movers 100. In this embodiment, the first mover may again be identified quickly upon power up without requiring motion of any of the movers 100.

Figure 10A:
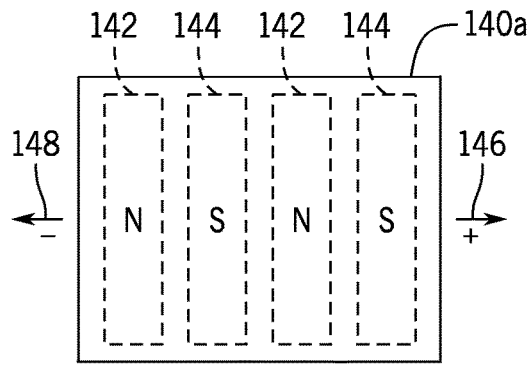
FIG. 10a is a partial front elevation view of the mover of FIG. 1 illustrating a set of drive magnets mounted in a first configuration on the mover.
Figure 10B:
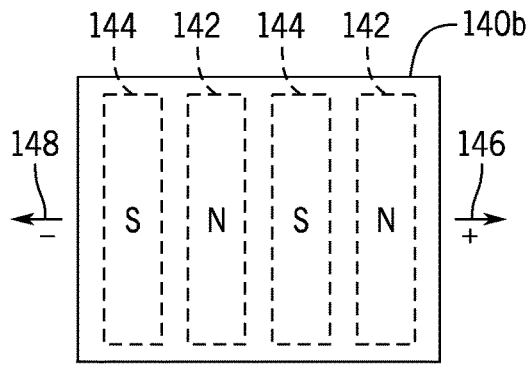
FIG. 10b is a partial front elevation view of the mover of FIG. 1 illustrating a set of drive magnets mounted in a second configuration on the mover.

According to still another embodiment of the invention, the configuration of the drive magnets 140 is set differently for the first mover than for each of the other movers. Referring next to FIGS. 10a and 10b, a first direction of travel 146 and a second direction of travel 148 are identified with respect to a set of drive magnets 140 for one of the movers 100, where the first direction of travel 146 is illustrated as a positive direction and the second direction of travel 148 is illustrated as a negative direction. In FIG. 10a, an arrangement for a first set of drive magnets 140a is shown, and in FIG. 10b, and arrangement for a second set of drive magnets 140b is shown. Both sets of drive magnets 140a, 140b include magnet segments alternately having a north pole, N, 142 and a south pole, S, 144 facing the track segment. However, the first set of drive magnets 140a begins with a magnet segment having a north pole, N, 142 facing toward the track and adjacent the side of the mover toward the negative direction of travel 148 and the second set of drive magnets 140b begins with a magnet segment having a south pole, S, 144 facing toward the track and adjacent the side of the mover toward the negative direction of travel 148.

At power up, a current is supplied to the coils 50 along the drive which generates an electromagnetic field in the coil 50 and, as a result, applies a small positive driving force to each mover 100. The resulting motion of the movers is used to identify the first mover. Each mover 100 having the first set of drive magnets 140a will move in one direction, and each mover 100 having the second set of drive magnets 140b will move in the opposite direction. The first mover is constructed to have either the first set 140a or second set 140b of drive magnets and each of the other movers 100 are constructed to have the other set of drive magnets. Although a small amount of motion is required to identify the first mover, this embodiment allows the uniform construction of the position sensing system.

Figure 11A:
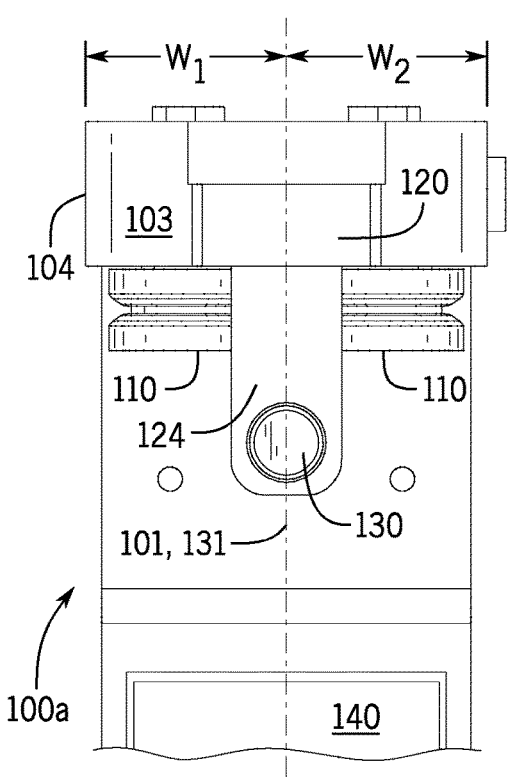
FIG. 11a is a partial front elevation view of the mover of FIG. 1 with a single position magnet mounted on the mover.
Figure 11B:
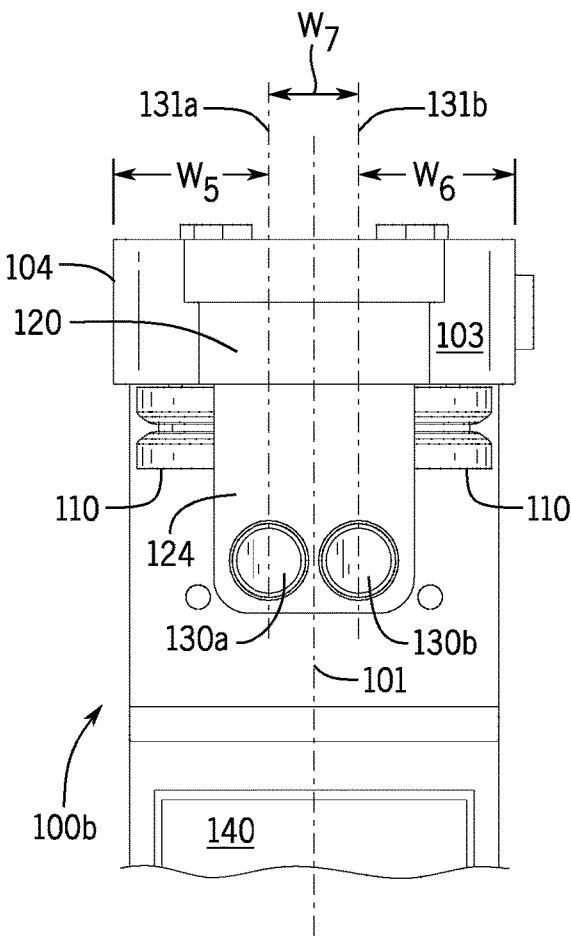
FIG. 11b is a partial front elevation view of the mover of FIG. 1 with multiple position magnets mounted on the mover.

According to yet another embodiment of the invention as illustrated in FIGS. 11a and 11b, the first mover includes a second position magnet 130 mounted to the mover 100 while each of the other movers have a single position magnet 130. With reference first to FIG. 11a, a mover identical to those illustrated and discussed above with respect to FIGS. 8a and 9a is shown. Each of the movers 100 other than the first mover in the transport system have the single position magnet 130 shown in FIG. 11a. With reference then to FIG. 11b, the second portion 124 of the second segment 120 of the top member 104 of the mover 100 has a first position magnet 130a and a second position magnet 130b mounted therein. The first position magnet 130a has a first central axis 131a, and the second position magnet 130b has a second central axis 131b. The first central axis 131a is offset in a first direction from the central axis 101 of the mover, and the second central axis 131b is offset in a second direction from the central axis 101 of the mover. As a result, the first central axis 131a is positioned at a fifth width, $W_5$, from one edge of the mover 100, the second central axis 131b is positioned at a sixth width, $W_6$, from the other edge of the mover 100, and the first and second central axes 131a, 13b are spaced apart for a seventh width, $W_7$.

The position sensing system senses the location of each position magnet 130a, 130b present along the length of the track. For each of the other movers, the position sensing system detects a single position magnet 130. For the first mover, the position sensing system detects both the first position magnet 130a and the second position magnet 130b. Either the segment controller 200 or the system controller 35 may be configured to compare the distances between each position magnet located. The seventh width, $W_7$, as illustrated in FIG. 11b, is a known distance and may be stored in memory of one of the controllers. The distance detected between position magnets 130 may be compared to the seventh width and the mover 100 present at the location with the two position magnets 130 spaced apart by the seventh width is determined to be the first mover. According to another embodiment, the distance between each adjacent position magnet 130 may be compared. If the distance between any two position magnets 130 is less than the width of the mover 100, the mover located by these two position magnets 130 is identified as the first mover. If, however, two movers 100 are adjacent to each other, it is possible, the distance between the position magnet 130 for one of the other movers and the distance to one of the position magnets 130a, 130b on the first mover is also less than the width of a mover 100. Preferably, the seventh width, $W_7$, is less than half the width of the mover 100 and, therefore, if two movers 100 are adjacent such that multiple distances between position magnets 130 are less than the width of a mover 100, the smaller distance between position magnets identifies the first mover. As a result, this embodiment may also identify the first mover quickly upon power up without requiring motion of any of the movers 100.

Figure 12A:
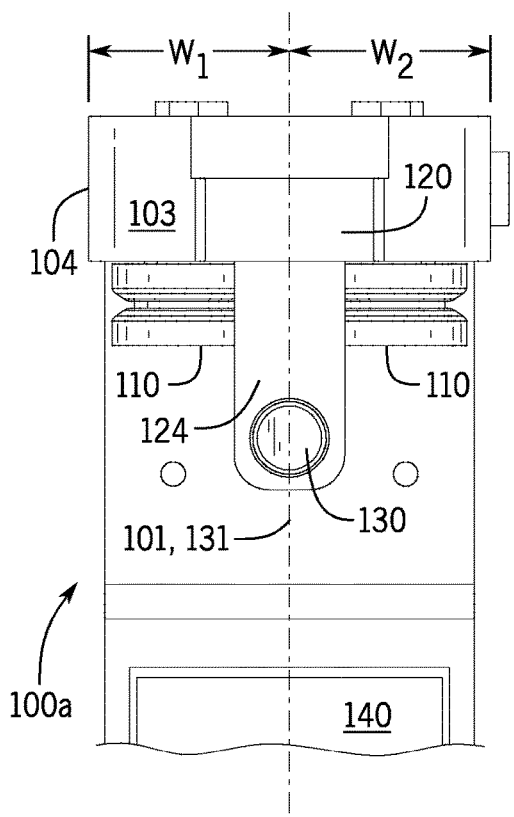
FIG. 12a is a partial front elevation view of the mover of FIG. 1 with a position magnet having a first shape mounted on the mover.
Figure 12B:
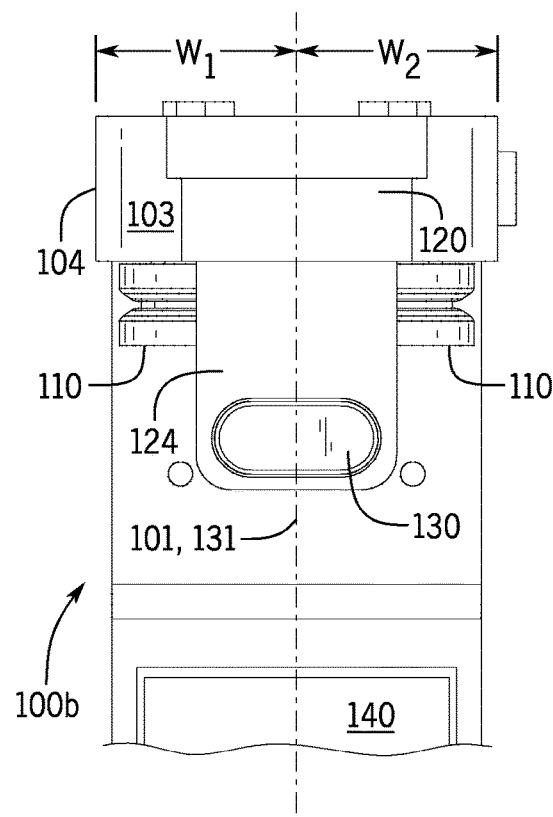
FIG. 12b is a partial front elevation view of the mover of FIG. 1 with a position magnet having a second shape mounted on the mover.

According to yet another embodiment of the invention, the shape of the position magnet 130 is set different for the first mover than for each of the other movers. The magnetic field generated by the position magnet 130 is a function of the construction of the position magnet 130, including, but not limited to, the material from which the magnet is constructed, the shape of the magnet, and the orientation of the magnet. Referring next to FIGS. 12a and 12b, a position magnet 130 mounted on the mover 100a in FIG. 12a has a different shape and size than a position magnet 130 mounted on the mover 100b in FIG. 12b. Consequently, the magnetic field generated by the position magnet 130 mounted on the mover 100a in FIG. 12a may have a different shape, a different orientation of the magnetic flux lines, or a different strength than the magnetic field generated by the position magnet 130 mounted on the mover 100b in FIG. 12b. It is contemplated that the first mover could be constructed with the position magnet as shown in either FIG. 12a or FIG. 12b and the other movers would then be constructed with the other position magnet. Further, the illustrated magnets represent one embodiment of the invention and it is contemplated that other shapes of magnets, magnets having identical shapes but different field strengths, or magnets having different physical orientations may be utilized without deviating from the scope of the invention.

As previously discussed, the sensors 150 in the position sensing system may be spaced along the track at a distance that permits multiple sensors 150 to detect the magnetic field generated by one position magnet 130. Thus, if the strength of the magnetic field varies due to the size, shape, or physical material of the position magnet 130 being different, the relative strength of the magnetic field detected at two or more sensors and, therefore, at two or more locations along the track will vary and may be compared to determine the location of each position magnet 130 with respect to the locations of each sensor 150 sensing the magnetic field generated by the magnet 130. The memory 34, 306 in the system controller 30 or the segment controller 200, respectively, may include a look-up table which includes the relationship between the strength of the magnetic field detected at each sensor 150 and the correspondence to the size, shape, or physical material of each position magnet 130. The controller may utilize the look-up table to identify each position magnet 130 and, more specifically, to identify which position magnet 130 is different than the other position magnets and, thereby, identify the first mover.

According to still another embodiment of the invention, the position sensing system may include a first set of sensors 150 and a second set of sensors. The first set of sensors may generate an analog signal, or signals, 155 as illustrated in FIG. 13 that varies as a function of the strength or angle of the magnetic field detected by each sensor 150. The second set of sensors may be, for example, a Hall Effect sensor that generates a signal corresponding to a polarity of the magnetic field detected by each sensor 150. The position magnet 130 on a first mover 100 may be mounted with either the north or the south polarity facing the sensors 150, and the position magnets 130 on each of the other movers 100 may be mounted with the opposite polarity facing the sensors 150. In this manner, the strength or angle of the magnetic field for each position magnet 130 corresponds to the same displacement along the rail 12 from a sensor 150 for each mover. The controller detects the first mover 100 by identifying the mover in which the polarity of the position magnet 130 is reversed.

It should be understood that the invention is not limited in its application to the details of construction and arrangements of the components set forth herein. The invention is capable of other embodiments and of being practiced or carried out in various ways. Variations and modifications of the foregoing are within the scope of the present invention. It also being understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention.

We claim:

1. A system for identifying a first mover, selected from a plurality of movers, wherein each of the plurality of movers is configured to travel along a track, the system comprising:
a plurality of magnets, wherein at least one magnet is mounted to each of the plurality of movers and generates a magnetic field; and
a plurality of sensors spaced along the track, wherein:
a first magnet, selected from the plurality of magnets, is mounted to the first mover,
each of the plurality of sensors generates a first signal having a first waveform corresponding to the magnetic field generated by the first magnet as the first mover passes the corresponding sensor,
each of the plurality of sensors generates a second signal having a second waveform corresponding to the magnetic field generated by each of the other magnets in the plurality of magnets as each of the plurality of movers other than the first mover passes the corresponding sensor, and
the first waveform is different than the second waveform.

2. The system of claim 1 wherein:
an air gap is defined between each of the plurality of magnets and each of the plurality of sensors as one of the plurality of movers passes one of the sensors,
a first air gap distance exists between the first magnet and each of the plurality of sensors,
a second air gap distance exists between each of the other magnets in the plurality of magnets and each of the plurality of sensors, and
the first air gap distance is different than the second air gap distance.

3. The system of claim 1 wherein:
each of the plurality of movers has a central axis extending generally orthogonal to a direction of travel along the track,
the first magnet is mounted to the first mover at a first distance from the central axis, and
each of the other magnets in the plurality of magnets is mounted to one of the other movers at a second distance from the central axis, where the first distance is different than the second distance.

4. The system of claim 3 further comprising a drive system including:
a plurality of coils mounted along the track, and
at least one drive magnet mounted to each mover, wherein:
each of the plurality of coils is energized by a high frequency voltage,
a position of the at least one drive magnet on each mover with respect to the track is detected as a function of the high frequency voltage,
a location of the at least one magnet on each mover with respect to the track is determined, and
whether the at least one magnet is mounted at the first distance or the second distance for each mover is determined as a function of the position of the at least one drive magnet and the location of the at least one magnet on the corresponding mover.

5. The system of claim 1 further comprising at least one additional magnet mounted to the first mover, wherein each of the plurality of sensors generates the first signal corresponding to the magnetic field generated by a combination of the first magnet and the at least one additional magnet.

6. The system of claim 1 wherein at least two sensors, selected from the plurality of sensors, are operative in tandem to generate either the first signal or the second signal, the system further comprising:
a controller configured to receive a feedback signal from each of the at least two sensors to generate the first signal or the second signal and to identify the first mover as a function of either a relative strength or an angle of each feedback signal received from the at least two sensors for each position magnet.

7. The system of claim 1 wherein:
the first magnet includes a first shape, a first magnetic field strength, and a first orientation to generate a first magnetic field,
each of the other magnets includes a second shape, a second magnetic field strength, and a second orientation to generate a second magnetic field, and
at least one of the first shape and the second shape, the first magnetic field strength and the second magnetic field strength, or the first orientation and the second orientation is different, such that the first magnetic field is different than the second magnetic field.

8. The system of claim 1 wherein:
the first magnet is mounted to the first mover with a first polarity,
each of the other magnets in the plurality of magnets is mounted to one of the other movers with a second polarity, and
the first polarity is different than the second polarity.

9. The system of claim 8, wherein the first magnet and each of the other magnets in the plurality of magnets is a position magnet mounted on the corresponding mover.

10. The system of claim 8, wherein the first magnet and each of the other magnets is one of a plurality of drive magnets mounted on the corresponding mover.

11. A method for identifying a first mover, selected from a plurality of movers, wherein each of the plurality of movers travels along a track, the method comprising the steps of:
receiving a plurality of position signals at a controller, wherein:
each position signal is generated by one of a plurality of sensors spaced apart along the track,
each position signal corresponds to at least one magnet mounted to one mover of the plurality of movers, and
each position signal is either a first signal or a second signal, the first signal having a different waveform than the second signal;
comparing each of the plurality of position signals to each other in the controller;
identifying in the controller a first mover, selected from the plurality of movers, corresponding to the first signal.

12. The method of claim 11 wherein at least two sensors, selected from the plurality of sensors, generates the position signal corresponding to the at least one magnet mounted to one of the plurality of movers.

13. The method of claim 11 wherein:
the at least one magnet of the first mover includes a first shape, a first magnetic field strength, and a first orientation to generate a first magnetic field,
the at least one magnet of each of the movers includes a second shape, a second magnetic field strength, and a second orientation to generate a second magnetic field, and
at least one of the first shape and the second shape, the first magnetic field strength and the second magnetic field strength, or the first orientation and the second orientation is different.

14. The method of claim 11 wherein:
a first magnet is mounted to the first mover with a first polarity to generate the first signal,
each of the other magnets is mounted to one of the other plurality of movers with a second polarity to generate the second signal, wherein the first polarity is different than the second polarity.

15. The method of claim 14, wherein the first magnet and each of the other magnets is a position magnet mounted on the corresponding mover.

16. The method of claim 14, wherein the first magnet and each of the other magnets is one of a plurality of drive magnets mounted on the corresponding mover.

17. A system for identifying a first mover, selected from a plurality of movers, wherein each of the plurality of movers travels along a track, the system comprising:
a plurality of magnets, wherein at least one magnet is mounted to each of the plurality of movers and generates a magnetic field; and
a plurality of sensors spaced apart along the track, wherein:
each of the plurality of sensors generates a signal corresponding to the magnetic field generated by the at least one magnet mounted to a mover as the mover passes the sensor,
a first magnet mounted to the first mover has a first polarity,
each of the magnets mounted to the other movers has a second polarity,
the second polarity is opposite the first polarity,
the signal generated by the first magnet passing each of the plurality of sensors has a first waveform,
the signal generated by each of the magnets mounted to the other movers passing each of the plurality of sensors has a second waveform,
the first waveform is different than the second waveform, and
the first mover is identified as the mover on which the first magnet is mounted by a controlled detecting the first waveform.

18. The system of claim 17, wherein the first magnet and each of the other magnets in the plurality of magnets is a position magnet mounted on the corresponding mover.

19. The system of claim 17, wherein the first magnet and each of the other magnets is one of a plurality of drive magnets mounted on the corresponding mover.

20. The system of claim 19 wherein:
the first mover includes a first set of drive magnets;
the first set of drive magnets includes a plurality of first magnet segments arranged in alternating polarities,
each of the other movers includes a second set of drive magnets;
the second set of drive magnets includes a plurality of second magnet segments arranged in alternating polarities, and
the arrangement of polarities in the first set of drive magnets is different than the arrangement of polarities in the second set of drive magnets.

\* \* \* \* \*